United States Patent [19]

Fukuda et al.

[11] Patent Number: 5,563,222

[45] Date of Patent: Oct. 8, 1996

[54] POLYESTER RESIN COMPOSITION

[75] Inventors: Hideo Fukuda, Kyoto; Ryuichi Kohzu, Kashiba, both of Japan

[73] Assignees: New Japan Chemical Co., Ltd., Kyoto; Toyo Boseki Kabushiki Kaisha, Osaka, both of Japan

[21] Appl. No.: 594,527

[22] Filed: Jan. 31, 1996

[30] Foreign Application Priority Data

Feb. 2, 1995 [JP] Japan .................................. 7-015759

[51] Int. Cl.$^6$ ...................................................... C08F 20/00
[52] U.S. Cl. ......................... 525/437; 528/272; 528/298; 528/301; 528/302; 528/307; 528/308; 528/308.6; 525/437
[58] Field of Search .................................. 528/272, 298, 528/301, 302, 307, 308, 308.6; 525/437

[56] References Cited

U.S. PATENT DOCUMENTS

| 3,900,608 | 8/1975 | Dierkers et al. | 427/158 |
| 5,215,608 | 6/1993 | Stroud et al. | 156/64 |
| 5,488,117 | 4/1996 | Evans et al. | 252/47.5 |

*Primary Examiner*—Samuel A. Acquah
*Attorney, Agent, or Firm*—Leydig, Voit & Mayer, Ltd.

[57] ABSTRACT

The present invention is directed to a polyester resin composition comprising a polyester resin and a specific polyalkylene glycol derivative. The polyester resin composition of the invention is excellent in plasticity, compatibility, retention and resistance to volatilization.

3 Claims, No Drawings

POLYESTER RESIN COMPOSITION

BACKGROUND OF THE INVENTION

The present invention relates to a polyester resin composition which is excellent in any of plasticity, compatibility, retention and resistance to volatilization.

Polyester resins, typically polyethylene terephthalate, polybutylene terephthalate and the like, are widely used for manufacturing molded articles, synthetic fibers, etc. because of their superior properties. However, when used in preparing sheets, films, hoses and so on, a polyester resin should be plasticized by adding a modifier having a high compatibility with the polyester resin and a high plasticity.

Examples of such modifiers are aromatic ester compounds, aromatic ether compounds, alkyldiphenyl compounds, aromatic imide compounds, etc. Yet, these compounds are unsatisfactory in properties. For example, aromatic ester compounds, although relatively good in compatibility with polyester resins, have a problem of reducing the polymerization degree of the resin when melted together with the resin, resulting in impaired mechanical properties. Aromatic ether compounds, alkyldiphenyl compounds and aromatic imide compounds have problems that they are difficult to add in an amount sufficient to plasticize the resin owing to their low compatibility with the resin and that they are likely to bleed from molded articles due to the poor retention of the modifier in the resin. In short, polyester resin compositions with fully satisfactory properties are unknown at present.

SUMMARY OF THE INVENTION

An object of the present invention is to provide a polyester resin composition which is satisfactory in properties such as plasticity, compatibility, retention and resistance to volatilization.

Another object of the invention is to provide a polyester resin composition having satisfactory properties which is useful for wider applications.

The inventors of the present invention conducted extensive research and found that the objects of the invention can be achieved when a polyalkylene glycol derivative having a specific structure is used as a modifier for polyester resins. The present invention has been completed based on this novel finding.

According to the present invention, there is provided a polyester resin composition comprising a polyester resin and a polyalkylene glycol derivative represented by the formula (1)

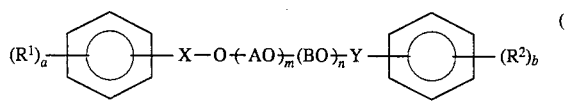

(1)

wherein $R^1$ and $R^2$ are the same or different and each represents a hydrogen atom or an alkyl group having 1 to 4 carbon atoms, a and b are each an integer of 1 to 3, X and Y are the same or different and each represents an alkylene group having 1 to 3 carbon atoms, AO and BO are the same or different and each represents an oxyalkylene group having 2 to 4 carbon atoms, m and n are integers and a total of m and n is 2 to 45. The derivative of the formula (1) will be hereinafter referred to as "present compound".

DETAILED DESCRIPTION OF THE INVENTION

The present compound can be easily prepared, for example, by heating, with stirring, 2 to 4 moles of a halogenated aralkyl per mole of the specific polyalkylene glycol in the presence of an alkali catalyst such as sodium hydroxide, potassium hydroxide or the like at a temperature of 50° to 120° C. to effect condensation reaction. In this reaction, various species of polyalkylene glycols and halogenated aralkyls can be used either alone or in combination.

Useful polyalkylene glycols include, for example, polyethylene glycol, polypropylene glycol, polytetramethylene glycol, random copolymers thereof, block copolymers thereof, etc.

A suitable polyalkylene glycol has a number average molecular weight of preferably 200 to 2,000, more preferably 300 to 1,000. Among said examples of glycols, a polyethylene glycol having a number average molecular weight of 300 to 1,000 is preferred. The polyalkylene glycol having a number average molecular weight of less than 200 is likely to show low resistance to volatilization when heated, leading to decreased content of the present compound in the resin composition and to reduced plasticizing effect. On the other hand, the polyalkylene glycol having a number average molecular weight exceeding 2,000 fails to provide a sufficient plasticizing effect and lowers the compatibility with the resin, causing more bleeding.

It is preferred to use a polyalkylene glycol derivative of the formula (1) wherein when AO and BO are both an oxyethylene group, a total of m and n is 4 to 45, when AO and BO are both an oxypropylene group, a total of m and n is 3 to 35, and when AO and BO are both an oxybutylene group, a total of m and n is 2 to 28.

Examples of the halogenated aralkyl are benzyl chloride, phenethyl chloride, 3-phenylpropyl chloride, 4-methylbenzyl chloride, 2,5-dimethylbenzyl chloride, 2,4,6-trimethylbenzyl chloride, 4-tert-butylbenzyl chloride, and like halogenated compounds, etc. Among them, benzyl chloride is preferred.

Preferred examples of the present compound are dibenzyl ether of at least one polyalkylene glycol selected from the group consisting of polyethylene glycol having a number average molecular weight of 200 to 2,000, polypropylene glycol having a number average molecular weight of 200 to 2,000, and polytetramethylene glycol having a number average molecular weight of 200 to 2,000. More preferred examples of the present compound are dibenzyl ether of at least one polyalkylene glycol selected from the group consisting of polyethylene glycol having a number average molecular weight of 300 to 1,000, polypropylene glycol having a number average molecular weight of 300 to 1,000 and polytetramethylene glycol having a number average molecular weight of 300 to 1,000.

It is suitable that the present compound have a number average molecular weight of preferably 380 to 2,180, more preferably 480 to 1,180.

Polyester resins which can be used in the present invention comprise terephthalic acid or dimethyl terephthalate as a main acid component and at least one alkylene glycol as a main glycol component which is selected from the group consisting of ethylene glycol, diethylene glycol, trimethylene glycol and tetramethylene glycol.

The terephthalic acid component may be partly replaced by an aromatic, alicyclic or aliphatic bifunctional carboxylic acid component.

Examples of the bifunctional carboxylic acid component are isophthalic acid, dimethyl isophthalate, naphthalenedicarboxylic acid, diphenyldicarboxylic acid, diphenyl ether dicarboxylic acid, 1,4-cyclohexanedicarboxylic acid, succinic acid, glutaric acid, adipic acid, pimelic acid, suberic acid, azelaic acid, sebacic acid, p-hydroxybenzoic acid, etc.

The glycol component may be partly replaced by an aromatic, alicyclic or aliphatic diol component.

Examples of the diol component are neopentyl glycol, polyalkylene glycol, 1,4-cyclohexanedimethanol, hydrogenated bisphenol A, ethylene oxide and/or propylene oxide adduct of hydrogenated bisphenol A, bisphenol A, ethylene oxide and/or propylene oxide adduct of bisphenol A, bisphenol S, etc.

The amount of the present compound used is suitably selected according to the intended purpose, but is usually 1 to 50 parts by weight, preferably 5 to 30 parts by weight, per 100 parts by weight of the polyester resin. Less than 1 part by weight is unlikely to produce the desired degree of plasticizing effect, whereas more than 50 parts by weight tends to cause a considerable degree of bleeding in the surface of the resin product, resulting in markedly reduced strength of the resin composition. Hence the amount of the present compound outside said range is undesirable.

The present compound can be admixed with a polyester resin by conventional methods. For example, a predetermined amount of the present compound is mixed with polyester powder or pellets in a mixer at below the softening point of the polyester, and an extrusion product is forced out from the mixer at more than the softening point of the polyester. Optionally the present compound may be mixed with the monomer before polymerization or may be added during polymerization.

The polyester resin composition of the present invention may contain, when required, additives such as specific stabilizers, surfactants, coloring agents, lubricants, fillers, antioxidants, ultraviolet absorbers, antistatic agents, etc. which would not adversely affect the desired effects.

Examples of useful stabilizers are epoxy compounds such as epoxidized soybean oil, epoxidized linseed oil, 3-(2-xenoxyl)-1,2-epoxypropane and the like; phosphoric acid compounds such as distearylpentaerythritol diphosphite, cyclic neopentane tetraylbis (octadecyl phosphite), a mixture of 1,1,3-tris(2-methyl-4-di-tridecyl phosphite-5-tert-butylphenyl)butane and phenyl phosphite and the like; phenolic compounds such as butylated hydroxytoluene, n-octadecyl-β-(4'-hydroxy-3',5'-di-tert-butylphenyl) propionate, triethylene glycol bis-3-(3-tert-butyl-4-hydroxy-5-methylphenyl)propionate, 1,3,5-trimethyl -2,4,6-tris(3,5-di-tert-butyl-4-hydroxybenzyl)benzene, tetrakis [methylene-3-(3',5'-di-tert-butyl-4'-hydroxyphenyl)propionate]methane, 1,3,5-tris(3,5-di-tert-butyl-4-hydroxybenzyl)-s-triazine-2,4,6(1H, 3H, 5H)-trione, etc. The amount of the stabilizer used is 0.01 to 2 parts by weight per 100 parts by weight of the polyester resin.

Examples of useful surfactants are nonionic surfactants such as polyoxyethylenealkyl (at least 7 carbon atoms) phenyl ether, polyoxypropylene polyoxyethylene block polymer, polyethylene glycol, polypropylene glycol, etc.; and anionic surfactants such as fatty acid (8–22 carbon atoms) salt (sodium, potassium or ammonium), alkyl (10–20 carbon atoms) sulfonate (sodium), alkyl (9–20 carbon atoms) benzene sulfonate (sodium), etc. The amount of the surfactant used is 0.1 to 2 parts by weight per 100 parts by weight of the polyester resin.

Examples of useful coloring agents are carbon black, titanium yellow, cobalt blue, ultramarine, dyes, etc. The amount of the coloring agent used is 0.1 to 1 part by weight per 100 parts by weight of the polyester resin.

Examples of useful lubricants are aliphatic hydrocarbons such as liquid paraffin, synthetic paraffin, petroleum wax, polyethylene wax, hydrogenated polybutene, etc.; higher fatty acids having 8–22 carbon atoms such as stearic acid; higher fatty acid salts having 8–22 carbon atoms (aluminum, calcium, magnesium or zinc); monohydric or polyhydric alcohol esters of fatty acids such as esters of higher fatty acids (4–22 carbon atoms) with aliphatic alcohols (4–18 carbon atoms), ethanediolmontanic acid ester, 1,3-butanediolmontanic acid ester, rice bran wax, etc.; hydrogenated caster oils, acetylated monoglyceride and like triglycerides and waxes; ethylenebis fatty acid (16–18 carbon atoms) amides, fatty acid (8–22 carbon atoms) amides and like higher fatty acid amides; dimethylpolysiloxane, methylphenyl polysiloxane and like silicone oils, other montanic acid salts (sodium or calcium), etc. The amount of the lubricant used is 0.1 to 3 parts by weight per 100 parts by weight of the polyester resin.

Examples of useful fillers are oxides such as magnesium oxide, aluminum oxide, silicon oxide, titanium oxide, chromium oxide, iron oxide, zinc oxide, etc.; carbonates such as magnesium carbonate, calcium carbonate, etc.; sulfates such as barium sulfate, etc.; silicates such as magnesium silicate, calcium silicate, sodium silicate, aluminum silicate, etc.; fibers and powders of silica, alumina, clay, talc, diatomaceous earth, glass, metals, carbons, etc.; and slugs, graphite, etc. The amount of the filler used is 1 to 50 parts by weight per 100 parts by weight of the polyester resin.

Examples of useful antioxidants are sulphur compounds such as alkyl disulfide, dilauryl 3,3'-thiodipropionate, distearyl 3,3'-thiodipropionate and like thiodipropionates and benzothiazoles; and organometallic compounds such as zinc dialkyldithiophosphate, zinc diaryldithiophosphate, etc. The amount of the antioxidant used is 0.01 to 2 parts by weight per 100 parts by weight of the polyester resin.

Examples of useful ultraviolet absorbers are salicylate compounds such as phenyl salicylate, p-tert-butylphenyl salicylate, etc.; benzophenone compounds such as 2-hydroxy -4-methoxybenzophenone, 2,2 -dihydroxy-4-methoxybenzophenone, 2 -hydroxy-4 -n-octoxybenzophenone, etc.; benzotriazole compounds such as 2-(2'-hydroxy-5'-methylphenyl)benzotriazole, 2-(2' -hydroxy-3'-tert-butyl-5'-methylphenyl) -5-chlorobenzotriazole, etc.; phenyl salicylate; cyanoacrylate compounds; etc. The amount of the ultraviolet absorber used is 0.01 to 2 parts by weight per 100 parts by weight of the polyester resin.

Examples of useful antistatic agents are anionic antistatic agents such as alkylsulfonate type, alkyl ether carboxylic acid type and dialkylsulfosuccinate type; nonionic antistatic agents such as polyethylene glycol derivatives, sorbitan derivatives and diethanolamine derivatives; cationic antistatic agents such as alkylamideamine type, alkyldimethylbenzyl type and like quaternary ammonium salts, alkylimidazoline type, alkylpyridinium type and like organic acid salts or hydrochlorides; and amphoteric antistatic agents such as alkylbetaine type and alkylimidazoline type. The amount of the antistatic agent used is 0.1 to 2 parts by weight per 100 parts by weight of the polyester resin.

The polyester resin composition thus obtained can be molded by conventional molding methods, e.g. injection molding, extrusion molding, powder molding, blow molding, etc. to produce machine parts, automobile parts, electrical parts, building materials, textile machine parts, containers, packaging materials, miscellaneous articles and so on. The resin composition of the invention is also useful as materials for films, tubes, rods, sheets, monofilaments or other extrusion products, or as coating materials.

The incorporation of the polyalkylene glycol derivative of the formula (1) into a polyester resin provides a polyester resin composition which is excellent in plasticity, compatibility, retention and resistance to volatilization.

BEST MODE FOR CARRYING OUT THE INVENTION

The present invention will be described below in more detail with reference to the following Examples and Comparative Examples. However, the present invention is not limited to the Examples.

EXAMPLE 1

An extruder was charged with 100 parts by weight of a polyethylene terephthalate resin (terephthalic acid/ethylene glycol-based resin, 0.910 in intrinsic viscosity) and 10 parts of dibenzyl ether of polyethylene glycol which glycol has a number average molecular weight of 300 (the dibenzyl ether thereof will be hereinafter referred to as "present compound 1"). The mixture was melted and mixed in the extruder, giving a resin composition in the form of a pellet. Then the intrinsic viscosity of the composition was determined. The pellets were hot-pressed to give a test piece, and the test piece was evaluated in mechanical properties, compatibility and resistance to volatilization. The results are shown in Table 1.

EXAMPLE 2

A polyester resin composition was prepared in the same manner as in Example 1 with the exception of using 10 parts by weight of dibenzyl ether of polypropylene glycol which glycol has a number average molecular weight of 400 (the dibenzyl ether thereof will be hereinafter referred to as "present compound 2") in place of the present compound 1. The obtained composition was evaluated in intrinsic viscosity, mechanical properties, compatibility and resistance to volatilization. The results are shown in Table 1.

EXAMPLE 3

A polyester resin composition was prepared in the same manner as in Example 1 with the exception of using 10 parts by weight of dibenzyl ether of polytetramethylene glycol which glycol has a number average molecular weight of 1,000 (the dibenzyl ether thereof will be hereinafter referred to as "present compound 3") in place of the present compound 1. The obtained composition was evaluated in intrinsic viscosity, mechanical properties, compatibility and resistance to volatilization. The results are shown in Table 1.

EXAMPLE 4

A polyester resin composition was prepared in the same manner as in Example 1 with the exception of using 10 parts by weight of dibenzyl ether of ethylene oxide/propylene oxide random adduct of glycol which adduct has a number average molecular weight of 1,000 and contains 20% by weight of propylene oxide (the dibenzyl ether thereof will be hereinafter referred to as "present compound 4") in place of the present compound 1. The obtained composition was evaluated in intrinsic viscosity, mechanical properties, compatibility and resistance to volatilization. The results are shown in Table 1.

EXAMPLE 5

A polyester resin composition was prepared in the same manner as in Example 1 with the exception of using 10 parts by weight of di-p-methylbenzyl ether of polyethylene glycol which glycol has a number average molecular weight of 300 (the di-p-methylbenzyl ether thereof will be hereinafter referred to as "present compound 5") in place of the present compound 1. The obtained composition was evaluated in intrinsic viscosity, mechanical properties, compatibility and resistance to volatilization. The results are shown in Table 1.

EXAMPLE 6

A polyester resin composition was prepared in the same manner as in Example 1 with the exception of using the present compound 1 in an amount of 5 parts by weight. The obtained composition was evaluated in intrinsic viscosity, mechanical properties, compatibility and resistance to volatilization. The results are shown in Table 1.

EXAMPLE 7

A polyester resin composition was prepared in the same manner as in Example 1 with the exception of using the present compound 1 in an amount of 20 parts by weight. The obtained composition was evaluated in intrinsic viscosity, mechanical properties, compatibility and resistance to volatilization. The results are shown in Table 1.

COMPARATIVE EXAMPLE 1

The polyethylene terephthalate resin used in Example 1 was evaluated in intrinsic viscosity, mechanical properties, and resistance to volatilization. The results are shown in Table 1.

COMPARATIVE EXAMPLE 2

A polyester resin composition was prepared in the same manner as in Example 1 with the exception of using 10 parts by weight of dioctyl phthalate (hereafter abbreviated to "DOP") in place of the present compound 1. The obtained composition was evaluated in intrinsic viscosity, mechanical properties, compatibility and resistance to volatilization. The results are shown in Table 1.

The properties of the polyester resin compositions prepared in the Examples and Comparative Examples were evaluated by the following methods.

[Intrinsic Viscosity]

The resin composition was dissolved in a 6:4 (wt ratio) phenol/tetrachloroethane solvent mixture and the intrinsic viscosity of the solution at 30° C. was measured. The variation of polymerization degree was evaluated by comparison with the intrinsic viscosity of a plasticizer-free resin.

[Mechanical Properties]

The plasticity was determined according to JIS K-6301.

[Compatibility]

A sheet press molded from the resin composition was left to stand in a thermo-hygrostat at 25° C. and 60% RH for 48 hours. Then the sheet was visually inspected to check the extent of bleeding of the present compound (plasticizer) in the surface of the sheet. The compatibility of the plasticizer with the resin and the retention thereof in the resin composition were rated on A to C scale:

A: No bleeding
B: A little bleeding
C: Surface wetted with the plasticizer.

[Resistance to Volatilization]

A sheet press molded from the resin composition was heated at 120° C. in a gear oven for 7 days. The ratio (wt. %) of weight decrease of the test piece before and after heating was calculated, whereby the volatilization resistance of the present compound (plasticizer) when heated was evaluated.

TABLE 1

|  | Example | | | | | | | Comparative Example | |
|---|---|---|---|---|---|---|---|---|---|
|  | 1 | 2 | 3 | 4 | 5 | 6 | 7 | 1 | 2 |
| Present compound (plasticizer) | 1 | 2 | 3 | 4 | 5 | 1 | 1 | — | DOP |
| Intrinsic viscosity (dl/g) | 0.908 | 0.909 | 0.908 | 0.905 | 0.907 | 0.911 | 0.906 | 0.910 | 0.783 |
| Mechanical properties | | | | | | | | | |
| Tensile modulus (t/cm$^2$) | 7 | 9 | 8 | 8 | 12 | 17 | 0.2 | 28 | 12 |
| Breaking strength (kg/cm$^2$) | 510 | 520 | 520 | 510 | 530 | 540 | 480 | 570 | 320 |
| Breaking extension (%) | 300 | 310 | 300 | 290 | 270 | 260 | 320 | 250 | 190 |
| Compatibility | A | A | A | A | B–A | A | A | — | B |
| Resistance to volatilization (wt %) | 1.9 | 1.5 | 1.0 | 1.2 | 0.9 | 1.1 | 2.1 | 0.6 | 6.8 |

What we claim is:

1. A polyester resin composition comprising a polyester resin and a polyalkylene glycol derivative represented by the formula (1)

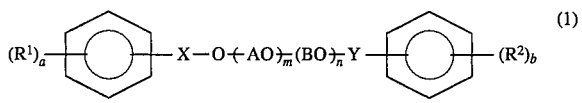

wherein $R^1$ and $R^2$ are the same or different and each represents a hydrogen atom or an alkyl group having 1 to 4 carbon atoms, a and b are each an integer of 1 to 3, X and Y are the same or different and each represents an alkylene group having 1 to 3 carbon atoms, AO and BO are the same or different and each represents an oxyalkylene group having 2 to 4 carbon atoms, m and n are integers and a total of m and n is 2 to 45.

2. The polyester resin composition according to claim 1, wherein the polyalkylene glycol derivative is dibenzyl ether of at least one polyalkylene glycol selected from the group consisting of polyethylene glycol having a number average molecular weight of 200 to 2,000, polypropylene glycol having a number average molecular weight of 200 to 2,000, and polytetramethylene glycol having a number average molecular weight of 200 to 2,000.

3. The polyester resin composition according to claim 1, wherein the content of polyalkylene glycol derivative is 1 to 50 parts by weight per 100 parts by weight of the polyester resin.

* * * * *